United States Patent
Mangnus et al.

(10) Patent No.: US 6,444,753 B1
(45) Date of Patent: Sep. 3, 2002

(54) POLYESTER MOLDING COMPOSITION

(75) Inventors: Robertus Maria Mangnus, Bergen op Zoom; Gerrit de Wit, Ossendrecht, both of (NL)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/552,472

(22) Filed: Apr. 18, 2000

Related U.S. Application Data

(60) Provisional application No. 60/190,859, filed on Mar. 20, 2000, and provisional application No. 60/134,145, filed on May 14, 1999.

(51) Int. Cl.⁷ .............................................. C08L 53/00
(52) U.S. Cl. ........................ 525/88; 525/169; 525/171
(58) Field of Search ........................................... 525/88

(56) References Cited

U.S. PATENT DOCUMENTS

| | | |
|---|---|---|
| 3,018,272 A | 1/1962 | Grffing et al. |
| 3,546,008 A | 12/1970 | Shields et al. |
| 3,954,903 A | 5/1976 | Kudo et al. |
| 3,965,055 A * | 6/1976 | Shichman ........................ 260/3 |
| 4,292,233 A | 9/1981 | Binsack et al. |
| 4,753,986 A | 6/1988 | Wang |
| 5,162,416 A | 11/1992 | Udipi et al. |
| 5,210,134 A | 5/1993 | Akkapeddi et al. |
| 5,219,915 A * | 6/1993 | McKee ........................ 524/504 |
| 5,298,550 A * | 3/1994 | Riccardi ........................ 524/513 |
| 5,475,053 A | 12/1995 | Neissner et al. |
| 5,556,903 A * | 9/1996 | Green ........................ 524/142 |

FOREIGN PATENT DOCUMENTS

| | | |
|---|---|---|
| DE | 4101699 A1 | 7/1992 |
| EP | 0614943 A3 | 9/1994 |

* cited by examiner

*Primary Examiner*—Paul R. Michl

(57) ABSTRACT

A polyester molding composition which includes the presence of gloss reducing amounts of PET, polyester containing ionomeric groups, or mixtures thereof in a PBT/styrenic impact modifier blend for providing low gloss on a textured surface.

20 Claims, No Drawings

POLYESTER MOLDING COMPOSITION

This application claims rights of priority from U.S. Provisional Patent Applications Serial Nos. 60/190,859 filed Mar. 20, 2000 and No. 60/134,145 filed May 14, 1999.

FIELD OF THE INVENTION

The invention relates to blends of polyester resin.

SUMMARY OF THE INVENTION

Blends of polybutylene terephthalate with styrenic impact modifier (PBT/Styrenic) give good mechanical properties such as impact strength, high Vicat values and chemical resistance. For certain applications, such as interior automotive parts, it is desirable for the surface of a part after injection molding to have low gloss. The surface in these applications is normally textured, and it is desirable that the gloss level is low. These blends, however, do not show gloss levels that are low enough. The problem to be solved is to formulate a PBT/Styrenic impact modifier blend formulation that has low gloss on a textured surface.

Some polyester/ABS blends are described in the following references. EP 383058A1 to Liu et al describes a polyester with ABS. DE 4101699 to Bayer describes a composition including a polyester in the amount from 30 to 80 percent with styrenic modifiers. U.S. Pat. No. 4,292,233 to Binsack et al describes improving the toughness of PBT by adding an ABS-graft copolymer having a high content of graft base and a defined particle size. U.S. Pat. No. 4,753,986 to Wang describes improving the impact strength of linear polyesters by incorporating a core-shell impact modifier. EP 614943A2 to Kuruganti et al describes a PBT blend with rubber graft (grafted vinyl aromatic and vinyl cyanide monomers (ABS)), and with non-grafted vinylcyanide-vinyl aromatic copolymer (SAN), and with carboxylic fatty acid metal salts. U.S. Pat. No. 5,475,053 to Niessner et al relates to an impact modified molding composition containing a thermoplastic with an acrylate based matting agent. U.S. Pat. No. 5,162,416 to Udipi relates to impact resistant polymer blends of polyester, ABS and an impact modifying amount of a fatty acid salt. U.S. Pat. No. 5,210,134 to Akkapeddi relates to a modified styrenic polymer comprising a polyester and a maleated ABS. U.S. Pat. No. 3,954,903 to Kudo et al describes an impact resistant ABS resin including a saturated polyester.

The references are deficient in describing a solution to the problem of achieving high impact, low gloss properties with the PBT/Styrenic impact modifier blend. Hence, it is desired to have a PBT/Styrenic impact modifier blend formulation that is low gloss on a textured surface.

SUMMARY OF THE INVENTION

It has been found that gloss reducing amounts of polyethylene terephthalate (PET) or polyester ionomer, or mixtures thereof may be used a in a blend of PBT and a styrene polymer to provide low gloss on a textured surface. Examples of polymers referred to as styrene polymers are acrylonitrile-butadiene-styrene (ABS), acrylonitrile-butadiene-alpha-methylstyrene, styrene-butadiene, styrene butadiene styrene (SBS), styrene ethylene butylene styrene (SEBS), methacrylate-butadiene-styrene (MBS), acrylate-styrene-acrylonitrile (ASA), acrylonitrile-EPDM-styrene (AES) and other high impact styrene-containing polymers.

DETAILED DESCRIPTION OF PREFERRED EMBODIMENTS

The terms PBT ionomer, PBT containing ionomeric groups, polyester ionomer, or sulfonate polyester or metal sulfonate polyester, generally refers to polyester polymers derived from the reaction residue of an aryl carboxylic sulfonate salt, an aromatic dicarboxylic acid, an aliphatic diol or any of their ester forming derivatives. The ionomer polyester polymers comprise some monovalent and/or divalent sulfonate salt units represented by the formula IA:

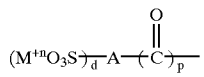

or formula IB:

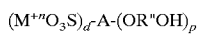

wherein p=1–3; d=1–3, and p+d=2–6, and A is an aryl group containing one or more aromatic rings; for example, benzene, naphthalene, anthracene, biphenyl, terphenyl, oxy diphenyl, sulfonyl diphenyl or alkyl diphenyl, where the sulfonate substituent is directly attached to an aryl ring. These groups are incorporated into the polyester through carboxylic ester linkages. The aryl groups may contain one or more sulfonate substituents; d=1–3 and may have one or more carboxylic acid linkages; p=1–3. Groups with one sulfonate substituent (d=1) and two carboxylic linkages (p=2) are preferred. M is a metal, n=1–5. Preferred metals are alkaline or alkaline earth metals where n=1–2. Zinc and tin are also preferred metals. R" is a divalent group, for example, —CH$_2$CH$_2$—, —CH$_2$CH$_2$OCH$_2$CH$_2$—, —CH(CH$_3$)CH$_2$—, —CH$_2$CH$_2$CH$_2$—, and —CH$_2$CH$_2$CH$_2$.

Typical sulfonate substituents that can be incorporated into the metal sulfonate polyester copolymer may be derived from the following carboxylic acids or their ester forming derivatives: sodium sulfo isophthalic acid, potassium sulfo terephthalic acid, sodium sulfo naphthalene dicarboxylic acid, calcium sulfo isophthalate, potassium 4,4'-di(carbomethoxy)biphenyl sulfonate, lithium 3,5-di(carbomethoxy)benzene sulfonate, sodium p-carbomethoxy benzene sulfonate, dipotassium 5-carbomethoxy-1,3-disulfonate, sodio 4-sulfo naphthalene-2,7-dicarboxylic acid, 4-lithio sulfophenyl-3,5-dicarboxy benzene sulfonate, 6-sodiosulfo-2-naphthyl-3,5-dicarbomethoxy benzene sulfonate and dimethyl 5-(4-(sodiosulfo)phenoxy) isophthalate. Other suitable sulfonate carboxylic acids and their ester forming derivatives are described in U.S. Pat. Nos. 3,018,272 and 3,546,008. The most preferred sulfonate polyesters are derived from sodium 3,5-dicarbomethoxy benzene sulfonate.

One ionomer polyester polymer comprises divalent ionomer units represented by the formula III:

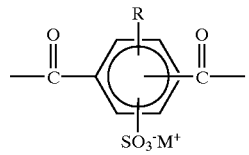

wherein R is hydrogen, halogen, alkyl or aryl, and M is a metal.

Another polyester ionomer has the formula IV:

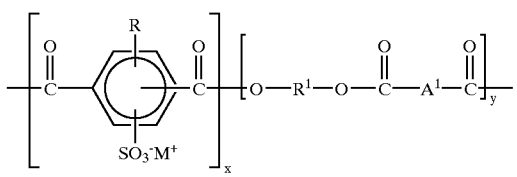

where the ionomer units, x, are from 0.1–50 mole percent of the polymer with 0.5 to 10 mole percent being preferred. Most preferably R is hydrogen. When R is hydrogen, $R^1$ is phenylene, and $A^1$ is an alkylene radical of from C1–C12, preferably from C2 or C4, and x and y are in mole percent, then x is from about 1 to about 20 percent, and more preferably from about 2 to about 15 percent, and most preferably from about 3 to about 12 percent.

Typical glycol or diol reactants, $R^1$, include straight chain, branched, or cycloaliphatic alkane diols and may contain from 2 to 12 carbon atoms. Examples of such diols include but are not limited to ethylene glycol; propylene glycol, i.e., 1,2- and 1,3-propylene glycol; butane diol, i.e., 1,3- and 1,4-butane diol; diethylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. A preferred cycloaliphatic diol is 1,4-cyclohexane dimethanol or its chemical equivalent. When cycloaliphatic diols are used as the diol component, a mixture of cis- to trans-isomers may be used, it is preferred to have a trans isomer content of 70% or more. Chemical equivalents to the diols include esters, such as dialkyl esters, diaryl esters and the like.

Examples of aromatic dicarboxylic acid reactants, as represented by the decarboxylated residue $A^1$, are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4-1,5- or 2,6-naphthalene dicarboxylic acids. The preferred dicarboxylic acids are terephthalic acid, isophthalic acid or mixtures thereof.

Ionomer polyesters include poly(ethylene terephthalate) (PET) ionomers, and poly(1,4-butylene terephthalate) ionomers, (PBT), and (polypropylene terephthalate) (PPT) ionomers.

One poly(1,4-butylene terephthalate)ionomer resin is obtained by polymerizing an ionomer component comprising a dimethyl 5-sodium sulfo-1,3-phenylenedicarboxylate, from 1 to 10 mole %, a glycol component of at least 70 mole %, preferably at least 90 mole %, of tetramethylene glycol and an acid component of at least 70 mole %, preferably at least 90 mole %, of terephthalic acid, and polyester-forming derivatives therefore.

Typical polyesters are derived from an aliphatic diol and an aromatic dicarboxylic acid having repeating units of the following general formula:

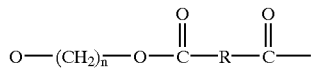

wherein n is an integer of from 2 to 6. R is a C6–C20 aryl radical comprising a decarboxylated residue derived from an aromatic dicarboxylic acid.

Examples of aromatic dicarboxcylic acids represented by the decarboxylated residue R are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4-1,5- or 2,6-naphthalenedicarboxylic acids. The preferred dicarboxcylic acids are terephthalic acid, isophthalic acid, napthalene dicarboxcylic acid or mixtures thereof.

Polyesters are poly(ethylene terephthalate) ("PET"), and poly(1,4-butylene terephthalate), ("PBT"), poly(ethylene naphthanoate) ("PEN"), poly(butylene naphthanoate), ("PBN") and (polypropylene terephthalate) ("PPT").

One poly(1,4-butylene terephthalate) resin is obtained by polymerizing a glycol component at least 70 mol %, preferably at least 80 mol %, which consists of tetramethylene glycol and an acid component at least 70 mol %, preferably at least 80 mol %, which consists of terephthalic acid, and polyester-forming derivatives therefore.

The polyesters used herein have an intrinsic viscosity of from about 0.4 to about 2.0 dl/gas measured in a 60:40 phenol/tetrachloroethane mixture or similar solvent at 23–30° C. VALOX™ 315 polyester is particularly suitable for this invention. Preferably the intrinsic viscosity is 1.1 to 1.4 dl/g.

The composition includes impact modifiers such as a rubbery impact modifier. Typical impact modifiers are derived from one or more monomers selected from the group consisting of olefins, vinyl aromatic monomers, acrylic and alkylacrylic acids and their ester derivatives as well as conjugated dienes. Especially preferred impact modifiers are the rubbery high-molecular weight materials showing elasticity at room temperature. They include both homopolymers and copolymers, including random, block, radial block, graft and core-shell copolymers as well as combinations thereof. Suitable modifiers include core-shell polymers built up from a rubber-like core on which one or more shells have been grafted. The core typically consists substantially of an acrylate rubber or a butadiene rubber. One or more shells typically are grafted on the core. The shell preferably comprises a vinylaromatic compound and/or a vinylcyanide and/or an alkyl(meth)acrylate. The core and/or the shell(s) often comprise multi-functional compounds which may act as a cross-linking agent and/or as a grafting agent. These polymers are usually prepared in several stages. Examples of polymers referred to as styrene polymers are acrylonitrile-butadiene-styrene (ABS), acrylonitrile-butadiene-alpha-methylstyrene, styrene-butadiene, styrene butadiene styrene (SBS), styrene ethylene butylene styrene (SEBS), methacrylate-butadiene-styrene (MBS), acrylate-styrene-acrylonitrile (ASA), acrylonitrile-EPDM-styrene (AES) and other high impact styrene-containing polymers.

The molding composition may include additional polymers that do not interfere with the desirable low gloss properties of the polymer blend. Such additional polymers include polycarbonate (PC) and styrene-acrylonitrile (SAN).

EXAMPLES

The following examples illustrate the present invention, but are not meant to be limitations to the scope thereof.

All the formulations were made by dry blending the polymeric compounds together with the stabilizers. Each dry blend was then melt blended in a PRISM 16 mm TSE corotating extruder. The temperature of the melt was about 265° C. (for impact modifier-rich blends about 10° C. lower)

and the screw speed was about 300 rpm. The extrudate was pelletized, dried at about 120° C. for two hours and then injection molded into test specimen employing an injection molding machine at a melt temperature in the barrel of the injection molding machine of about 265° C. (for impact modifier-rich blends approx. 10° C. lower) and a mold temperature of about 60° C. The test specimen where evaluated for tensile strengths in accordance with ISO 527 and Izod impact (INI, Izod Notch Impact at room temperature) in accordance with ISO 180.

The gloss was measured at an angle of 60 degrees on a test specimen molded using a textured mold, MT 9049.

Where amounts are in terms of percent, they are percent by weight unless otherwise stated. The ingredients employed in the examples are as follows:

PBT:

Polybutyleneterephthalate with a Tm of 225° C. Two viscosities are used: a PBT with a MVR (250° C./2.16 kg) of about 105 and a PBT with a MVR of about 9 cm³/10 min. In the examples always a 50/50 ratio of these PBT's is used.

PBT-ionomer:

Polybutyleneterephthalate in which a part (3 or 5 mol %) of the terephthalic units are replaced by 5-sulfoisophthalic acid, sodium salt. Both PBT-ionomers, PBT-3 and PBT-5 (with respectively 3 and 5 mol % terephthalate units in PBT replaced by the sulfonated isophthalate compound) with a viscosity of about 7000 poise.

PET:

Polyethyleneterephthalate with a Tm of 250° C. and a MVR (280° C./2.16 kg) of about 20 (cm³/10 min).

AES:

The AES used was Blendex WX270, a terpolymer of Acrylonitrile, EPDM rubber and Styrene with a MFR (220° C./10 kg) of 23 g/10 min (as determined in a 40/60 blend of SAN2856/WX270).

SAN:

A SAN having an S/AN ratio of 66/34 and MFR (220° C. /5 kg) of about 15 g/10 min.

SAN 2856, with a S/AN ratio of 28/72 and a MFR (220° C./5 kg) of about 18.5 g/10 min.

SAN 2765, with a S/AN ratio of 27/73 and a MFR (220° C./10 kg) of about 51 g/10 min.

SAN 2548, with a S/AN ratio of 25/75 and a MFR (220° C./5 kg) of about 41 g/10 min.

PC:

A PC was used with a MW of about 21.800 g/mol.

ASA:

ASA with butylacrylate/styrene/acrylonitrile=45/36/19.

All blends contain 0.1% carbon black (carbon black also contributes to low gloss), and a stabilizer package in an amount of 0.5–0.6% of 0.55% (a combination of a phosphite and a hindered phenol).

For the formulations and results see Tables 1, 2, 3 and 4:

TABLE 1

| Ingredient | A | 1 | 2 | B | 3 | 4 | 5 | 6 | 7 | 8 |
|---|---|---|---|---|---|---|---|---|---|---|
| PBT | 80 | | | 40 | | | 20 | 16 | | 35 |
| PBT-3 | | 80 | | | 40 | | 20 | 16 | 32 | |
| PBT-5 | | | 80 | | | 40 | | | | |
| PET | | | | | | | | 8 | 8 | 5 |
| HRG333 (ABS) | 20 | 20 | 20 | 60 | 60 | 60 | 60 | 60 | 60 | 60 |
| Gloss | 2.8 | 1.5 | 1.3 | 2.6 | 1.4 | 0.9 | 1.9 | 1.7 | 1.5 | 1.7 |
| INI (kJ/m2) | 8.6 | 8.9 | 7.7 | 48 | 39 | 18 | 23 | 30 | 13 | 42 |

TABLE 2

| Ingredient | 9 | C | 10 | E | 11 |
|---|---|---|---|---|---|
| PBT | 62.5 | 70 | 60 | 70 | 62.5 |
| PET | 7.5 | | 10 | | 7.5 |
| HRG338 (ABS) | 30 | 30 | 30 | | |
| ASA | | | | 30 | 30 |
| Gloss | 1.7 | 2.1 | 1.7 | 2.3 | 1.8 |
| INI (kJ/m2) | 59 | 60 | 56 | 7.7 | 7.2 |

Table 1 and 2 clearly shows that reference samples A, B and C and D, not belonging to this invention, have a significant higher gloss level (>2) than the formulations 1–11 belonging to this invention (gloss level <2).

TABLE 3

| Ingredient | F | 12 | 13 | 14 |
|---|---|---|---|---|
| PBT | 70 | 60 | 40 | 40 |
| PET | | 10 | 10 | 10 |
| AES WX270 | 30 | 30 | 35 | 40 |
| SAN 2548 | | | 15 | 10 |
| Gloss | 2.5 | 2.0 | 1.9 | 1.9 |
| INI (kJ/m2) | 72 | 67 | 16 | 20 |

The reference formulation F, without PET, has a higher gloss value than the formulations #12–#14 with PET.

TABLE 4

| Ingredient | G | 15 | 16 | 17 | H | 18 |
|---|---|---|---|---|---|---|
| PBT | 45 | 40.5 | 20 | 18 | 30 | 27 |
| PET | | 10 | | 10 | | 10 |
| HRG360 | 33 | 29.7 | | | | |
| HRG333 | | | 31 | 27.9 | 31 | 27.9 |
| SAN 2856 | 22 | 19.8 | | | | |
| SAN 2765 | | | 39 | 35.1 | 39 | 35.1 |
| PC | | | 10 | 9 | | |
| Gloss | 2.4 | 1.8 | 3.1 | 2.0 | 2.1 | 1.8 |
| INI (kJ/m2) | 16 | 14 | 24 | 37 | 10 | 12 |

The results of Table 4 clearly shows that the samples with PET in the formulation have lower gloss values than the corresponding reference samples.

The above formulations can be used for applications where low gloss of textured surfaces is required, for example, for interior automotive applications.

What is claimed is:

1. A polyester molding composition, comprising;

a blend of polybutylene terephthalate and a rubbery impact modifier; and an ionomer polyester polymer, wherein the ionomer polyester polymer comprises an ionomer unit having a formula (I):

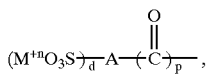

or a formula (II):

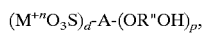

wherein p is 1, 2 or 3; d is 1, 2 or 3; p+d equals 2, 3, 4, 5 or 6, M is a metal and n is 1, 2, 3, 4, or 5; R" is selected from the group consisting of $-CH_2CH_2-$, $-CH_2CH_2OCH_2CH_2-$, $-CH(CH_3)CH_2-$, $-CH_2CH_2CH_2-$, and $-CH_2CH_2CH_2CH_2-$; and A is an aryl group containing one or more aromatic rings.

2. A composition according to claim 1, wherein the rubbery impact modifier comprises acrylonitrile-butadiene-styrene, acrylonitrile-butadiene-alphamethylstyrene, styrene-butadiene, styrenebutadiene styrene, styrene-ethylene butadiene styrene, methacyrlate-butadiene-stryene, acrylate-styrene-acrylonitrile, acrylonitrile-EPDM-styrene, or a combination comprising at least one of the foregoing rubbery impact modifiers.

3. A composition according to claim 1, wherein the ionomer polyester polymer is present in an amount of 1–100 wt % based on the weight of the polybutylene terephthalate.

4. A composition according to claim 3, wherein the ionomer polyester polymer is present in an amount of 20–100 wt. % based on the weight of the polybutylene terephthalate.

5. A composition according to claim 1, wherein the ionomer polyester polymer comprises ionomer units in an amount of 0.1–10 mole %, based on the amount of the ionomer polyester polymer.

6. A composition according to claim 5, wherein the ionomer polyester polymer comprises ionomer units in an amount of 0.5–5 mole %, based on the amount of the ionomer polyester polymer.

7. A composition according to claim 1, further comprising a non-grafted vinylcyanide-vinyl aromatic copolymer, a polycarbonate, or a mixture comprising at least one of the foregoing polymers.

8. A composition according to claim 7, wherein the content of the additive polymer is less than 50 wt. % based on the total amount of the composition.

9. A composition according to claim 8, wherein the content of the additive polymer is 5–45 wt. % based on the total amount of the composition.

10. A composition according to claim 1, further comprising at least one additive selected from the group consisting of flame retardants, carbon black, stabilizers, fillers, and a combination thereof.

11. A formed article comprising the composition of claim 1 and having a textured surface.

12. A composition according to claim 1, further comprising a gloss reducing amount of polyethylene terephthalate.

13. A composition according to claim 12, wherein the polyethylene terephthalate is present in an amount of 1–25 wt. % based on the total weight of the composition.

14. A composition according to claim 13, wherein the polyethylene terephthalate is present in an amount of 5–15 wt. % based on the total weight of the composition.

15. A polyester molding composition, comprising:

a blend of polybutylene terephthalate and 30–60% by weight of the total composition of a rubbery impact modifier; and a gloss reducing amount of polyethylene terephthalate.

16. The polyester molding composition of claim 15, wherein the rubbery impact modifier comprises acrylonitrile-butadiene-styrene, acrylonitrile-butadiene-alpha-methylstyrene, styrene-butadiene, styrenebutadiene styrene, styrene-ethylene butadiene styrene, methacyrlate-butadiene-stryene, acrylate-styrene-acrylonitrile, acrylonitrie-EPDM-styrene, or a combination comprising at least one of the foregoing rubbery impact modifiers.

17. The polyester molding composition of claim 15, wherein the polyethylene terephthalate is present in an amount of 1–25 wt. % based on the total amount of the composition.

18. The polyester molding composition of claim 15, wherein the polyethylene terephthalate is present in an amount of 5–15 wt. % based on the total amount of the composition.

19. A polyester molding composition according to claim 1, further comprising polycarbonate, a non-grafted vinylcyanide-vinyl aromatic copolymer, or a mixture comprising at least one of the foregoing polymers.

20. The polyester molding composition of claim 15, further comprising at least one additive selected from the group consisting of flame retardants, carbon black, stabilizers, fillers, and a combination thereof.

* * * * *